(12) United States Patent
Shen et al.

(10) Patent No.: US 6,847,810 B2
(45) Date of Patent: Jan. 25, 2005

(54) UNIFIED ANTENNA DIVERSITY SWITCHING SYSTEM FOR TDMA-BASED TELEPHONES

(75) Inventors: Qun Shen, San Diego, CA (US); Michael Lenzo, Apex, NC (US)

(73) Assignee: Ericsson Inc., Plano, TX (US)

( * ) Notice: Subject to any disclaimer, the term of this patent is extended or adjusted under 35 U.S.C. 154(b) by 702 days.

(21) Appl. No.: 09/794,533

(22) Filed: Feb. 27, 2001

(65) Prior Publication Data

US 2001/0055959 A1 Dec. 27, 2001

Related U.S. Application Data

(63) Continuation-in-part of application No. 09/000,643, filed on Dec. 30, 1997, now abandoned.

(51) Int. Cl.$^7$ ................................................. H04B 7/00
(52) U.S. Cl. ................................. 455/277.2; 455/562.1; 455/135; 455/67.13
(58) Field of Search ........................... 455/277.2, 277.1, 455/562.1, 272, 134, 135, 133, 67.11, 67.13, 63.1, 63.4, 67.16; 375/346, 347, 349; 342/367, 374; 343/893, 876

(56) References Cited

U.S. PATENT DOCUMENTS

| | | | | |
|---|---|---|---|---|
| 5,203,024 A | * | 4/1993 | Yamao | 455/277.1 |
| 5,446,922 A | * | 8/1995 | Siwiak et al. | 455/277.2 |
| 5,499,397 A | * | 3/1996 | Wadin et al. | 455/277.2 |
| 5,530,926 A | * | 6/1996 | Rozanski | 455/277.2 |
| 5,561,673 A | * | 10/1996 | Takai et al. | 455/277.2 |
| 5,799,042 A | * | 8/1998 | Xiao | 455/277.2 |
| 5,952,963 A | * | 9/1999 | Shen et al. | 455/133 |
| 5,960,046 A | * | 9/1999 | Morris et al. | 375/347 |
| 5,991,613 A | * | 11/1999 | Euscher et al. | 455/277.1 |
| 6,029,057 A | * | 2/2000 | Paatelma et al. | 455/277.2 |
| 6,032,033 A | * | 2/2000 | Morris et al. | 455/277.2 |
| 6,067,449 A | * | 5/2000 | Jager | 455/277.2 |
| 6,085,076 A | * | 7/2000 | Lindsay et al. | 455/277.1 |
| 6,483,884 B1 | * | 11/2002 | Shen et al. | 375/347 |
| 2001/0055959 A1 | * | 12/2001 | Shen et al. | 455/277.1 |

FOREIGN PATENT DOCUMENTS

| | | | | |
|---|---|---|---|---|
| WO | 99/34533 | * | 7/1999 | H04B/7/08 |
| WO | 99/34534 | * | 7/1999 | H04B/7/08 |
| WO | 99/34535 | * | 7/1999 | H04B/7/08 |

* cited by examiner

*Primary Examiner*—Rafael Perez-Gutierrez

(57) ABSTRACT

A system for selecting an antenna from a diversity of antennas in a DECT, PWT, or TDMA-based telecommunication system. The system combines multiple criteria to improve antenna diversity selections. The principal selection process is based on preamble diversity comparisons that operate in real-time. A preamble diversity switching circuit measures receive signal strength indicators (RSSI) from a plurality of antennas and selects the antenna that provides the highest RSSI value when the difference between the RSSI values exceeds a threshold. When the value of the RSSI difference falls below the threshold, the next selection process, a cyclical redundancy check (CRC) process is employed. The CRC process decodes a CRC value from a signal's content and compares it to a second threshold. If a CRC error is detected and the CRC value exceeds the second threshold, another antenna is selected. When the CRC value is below the prescribed threshold, the authority to select another antenna is transferred to the final selection process, a signal vector detection process (SVD). In the SVD process, the difference between a reference signal vector and a received signal vector is computed. If the function of the difference exceeds a third threshold, another antenna is selected. When the threshold is not met, diversity selections remain unchanged and control of the antenna selection process returns to the preamble diversity switching process. The SVD process may also be based on the gradient error vector which represents the magnitude of the received signal's rate of change.

45 Claims, 9 Drawing Sheets

UNIFIED ANTENNA DIVERSITY SWITCHING SYSTEM FOR TDMA-BASED TELEPHONES

CROSS REFERENCE TO RELATED APPLICATIONS

This application is a Continuation in Part of U.S. patent application Ser. No. 09/000,643, filed Dec. 30, 1997 now abandoned. The present embodiments utilize the processes and teachings disclosed in U.S. patent application Ser. No. 09/000,593 entitled "An Improved Antenna Diversity Switching System for TDMA Based Telephones" that was filed concurrently with this application and is hereby incorporated by reference. The present specification integrates the processes previously described and further integrates a signal vector detection process that tracks demodulation quality.

BACKGROUND OF THE INVENTION

This disclosure relates to a process for selecting an antenna in a wireless communication system having at least two antennas. In particular, the present invention is designed to select the best antenna based on a plurality of quality indicators.

In wireless communication systems, incoming signals often experience time dispersion and fading which is referred to as multipath effect. Multipath effect occurs when a signal and its replica arrive at a receiver out of phase to any extent. Generally, multipath effect occurs because artificial and natural obstructions cause transmitted signals to follow several propagation paths from a transmitter to a receiver. In wireless technology, the phase differences of the signals arriving at the receiver produce background noise, and in severe cases, cause the receiver to squelch. Conventional wireless technology utilizes antenna diversity to minimize this problem. A wireless network commonly includes more than one antenna positioned such that the signals received by the antennas are not correlated.

In DECT (Digital Enhanced Cordless Telecommunications) and PWT (Personal Wireless Telecommunications) systems, for example, two antennas are available in the base station and/or portable. FIG. 1 illustrates a block diagram of a conventional wireless base station having a diversity of antennas.

When more than one antenna is used in a wireless system, a protocol is employed to select the best antenna. Normally, antenna selection is based on a singular quality indicator adapted from the field of cryptography. The kinds of quality indicators may be divided into two categories namely: (1) those which are designed to authenticate signal transmissions and select an antenna as the signal is received and (2) those which are designed to authenticate signal transmissions and select an antenna after the signal is received. Known devices of both types have drawbacks and disadvantages.

In a TDMA-based system, for example, the antenna selection is controlled by software or logic circuitry. In this system, a cyclical redundancy check (CRC) like parameter is generally used to select an antenna after the signal is received. CRC is based on polynomial division in which each bit of a packet of data represents one coefficient of a polynomial. The polynomial is then divided by a pre-programmed polynomial to yield a quotient polynomial and in some cases a remainder polynomial. When the division yields a remainder polynomial, the system assumes that a transmission error occurred and selects another antenna. If, however, the division does not yield a remainder polynomial, the system assumes no transmission errors occurred and therefore does not select another antenna.

The antenna selection process is illustrated in FIG. 2. A CRC error rate that produces good speech quality is used as a threshold for selecting an appropriate antenna. If the present antenna provides a CRC error that is below the threshold value, no switching occurs. However, when the CRC error rate rises above the threshold value, another antenna is selected.

While CRC provides antenna selection by authenticating transmitted data, it has disadvantages. Its primary shortcoming is that antenna selections are not made in real time. The present antenna selected is based on a previous CRC comparison which does not change until the antenna receives a poor quality signal. The time delay that exists between receiving an incoming signal and selecting another antenna makes the selection process susceptible to errors due to interference. A CRC selection may be accurate if a transmitter or receiver is stationary or moves at a slow rate of speed, because the communication environment is subject only to slight variations in time. However, when a transmitter or receiver moves at a high rate of speed, this time delayed process may be ineffective because it may not react to a changing environment and thus, it may be susceptible to interference.

Another technique for antenna diversity switching authenticates signal transmissions and selects an antenna as the signals are received. Preamble diversity switching is an example of a system that provides real-time measurements and real-time antenna selection. Preamble diversity switching sequentially measures the receive signal strength of a diversity of antennas at the beginning of each extended preamble. The receive signal levels of each antenna, which are the Receive Signal Strength Indicators (RSSI), are stored and compared. The antenna with the higher RSSI value is selected. When the RSSI value associated with another antenna is higher, that antenna is then selected. An example of a preamble diversity switching process is shown in FIG. 3.

The preamble diversity switching process provides the benefit of selecting an antenna as signals are received. The system is less affected by rapid environmental change. However, problems arise when differences between RSSI values are insignificant. When insignificant differences exist, the system may experience some uncertainty when selecting an antenna. This is simply because minor differences in RSSI values indicate that the signal qualities received by the antennas are similar and therefore, an antenna selection will not necessarily improve receiving quality. Therefore, a preamble diversity switching process alone may not be the best parameter for selecting an antenna. An additional indicator may be desirable to select an optimal antenna.

It is therefore an object of the invention to implement an appropriate decision strategy in a DECT, PWT, and TDMA telecommunication systems that are based on real and predicted quality criteria.

Another object of the invention is to provide an improved antenna selection process for a TDMA telecommunication system that may pre-select an optimal antenna before an error is detected.

It is a further object of the invention to implement simple antenna selection algorithms that identify the antenna that will receive the highest quality signals.

Still another object of the invention is to provide an improved antenna selection process for TDMA telecommunication systems that tracks ancillary quality factors such as error vectors and gradient error vectors.

Yet another object of the invention is to seamlessly integrate multiple quality indicators into a sophisticated antenna switching strategy for TDMA telecommunication systems.

SUMMARY OF THE INVENTION

A system for selecting an antenna from a diversity of antennas in a DECT, PWT, or TDMA-based telecommunication system is disclosed. The system combines multiple criteria to improve antenna diversity selections. The principal selection process is based on preamble diversity comparisons that operate in real-time. A preamble diversity switching circuit measures receive signal strength indicators (RSSI) from a plurality of antennas and selects the antenna that provides the highest RSSI value when the difference between the RSSI values exceeds a predetermined threshold. When the value of the RSSI difference falls below the predetermined threshold, the next selection process, a cyclical redundancy check (CRC) process is employed. The CRC process decodes a CRC value from a signal's content and compares it to a second predetermined threshold. If a CRC error is detected and the CRC value exceeds the second predetermined threshold, another antenna is selected. When the CRC value is below the prescribed threshold, the authority to select another antenna is transferred to the final selection process, a signal vector detection process (SVD). In the SVD process, the difference between a reference signal vector and a received signal vector is computed. If the function of the difference exceeds a third predetermined threshold, another antenna is selected. When the threshold is not met, diversity selections remain unchanged and control of the antenna selection process returns to the preamble diversity switching process. It should be noted, the SVD process may also be based on the gradient error vector, $\nabla f(E_{k,n1})$, which represents the magnitude of the received signal's rate of change.

DETAILED DESCRIPTION OF THE PRESENTLY PREFERRED EMBODIMENTS

Embodiments

The signal vector detection process used in a first embodiment focuses on phase modeling and phase prediction of broadcast signals for TDMA communication systems. In this process, a signal vector detection error or error vector $E_{k,n1}$ is calculated by subtracting an estimated signal vector $\hat{s}_{k,n1}$ from a reference signal vector $s_{k,n1}$. ($E_{k,n1} = s_{k,n1} - \hat{s}_{k,n1}$). A function, $f(E_{k,n1})$, is then calculated. In this embodiment, a sum (SUM) of the absolute value (ABS) of $E_{k,n1}$, is calculated ($f(E_{k,n1}) = \text{SUM}(\text{ABS } E_{k,n1})$). However, other mathematical functions may be used. Since $E_{k,n1}$ is measured during the receiving process and is compared to a predetermined threshold, an antenna selection decision will not occur in real time as in a batch process. However, the signal detection process may also be based on a second criteria, a gradient error vector, $\nabla f(E_{k,n1})$.

The term "gradient" as used in this specification is used to describe a vector that represents the magnitude of a signal's rate of change. With respect to TDMA utilization, an antenna selection based on the gradient error vector can initiate antenna selections before signal quality declines.

Figure 1:
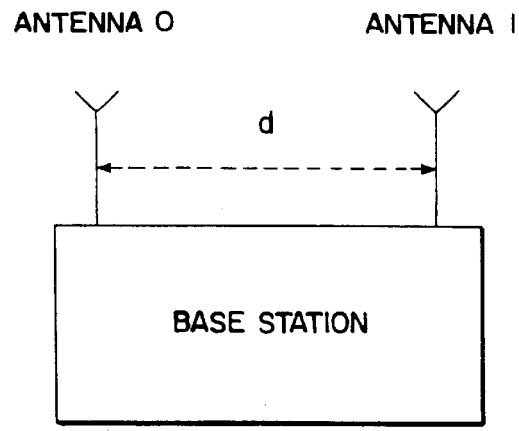
FIG. 1 is a block diagram of a conventional wireless base station having a diversity of antennas.
Figure 2:
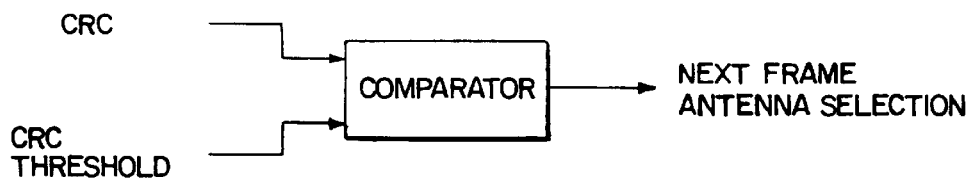
FIG. 2 is a block diagram of a Cyclical Redundancy Check antenna switching process used in the prior-art station of FIG. 1.
Figure 3:
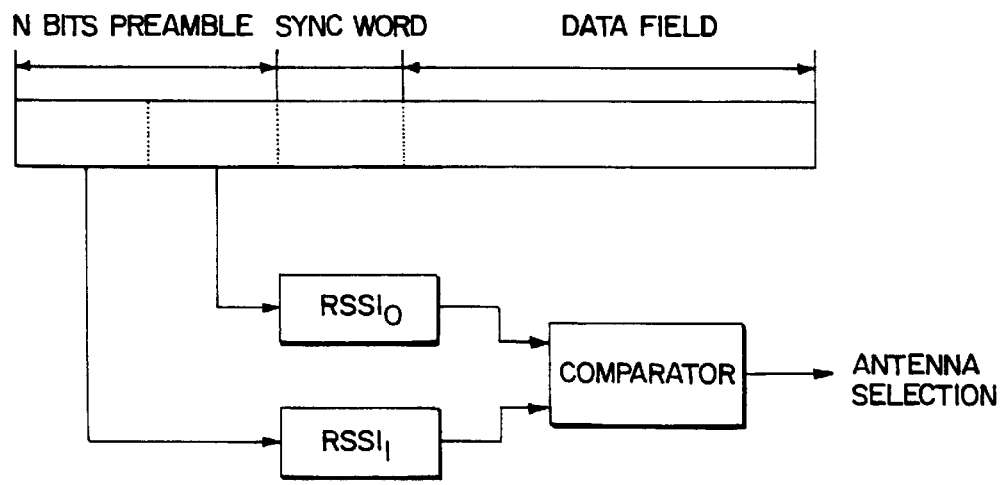
FIG. 3 is a block diagram of a Preamble Diversity Switching Process also used in the prior-art station of FIG. 1.
Figure 4:
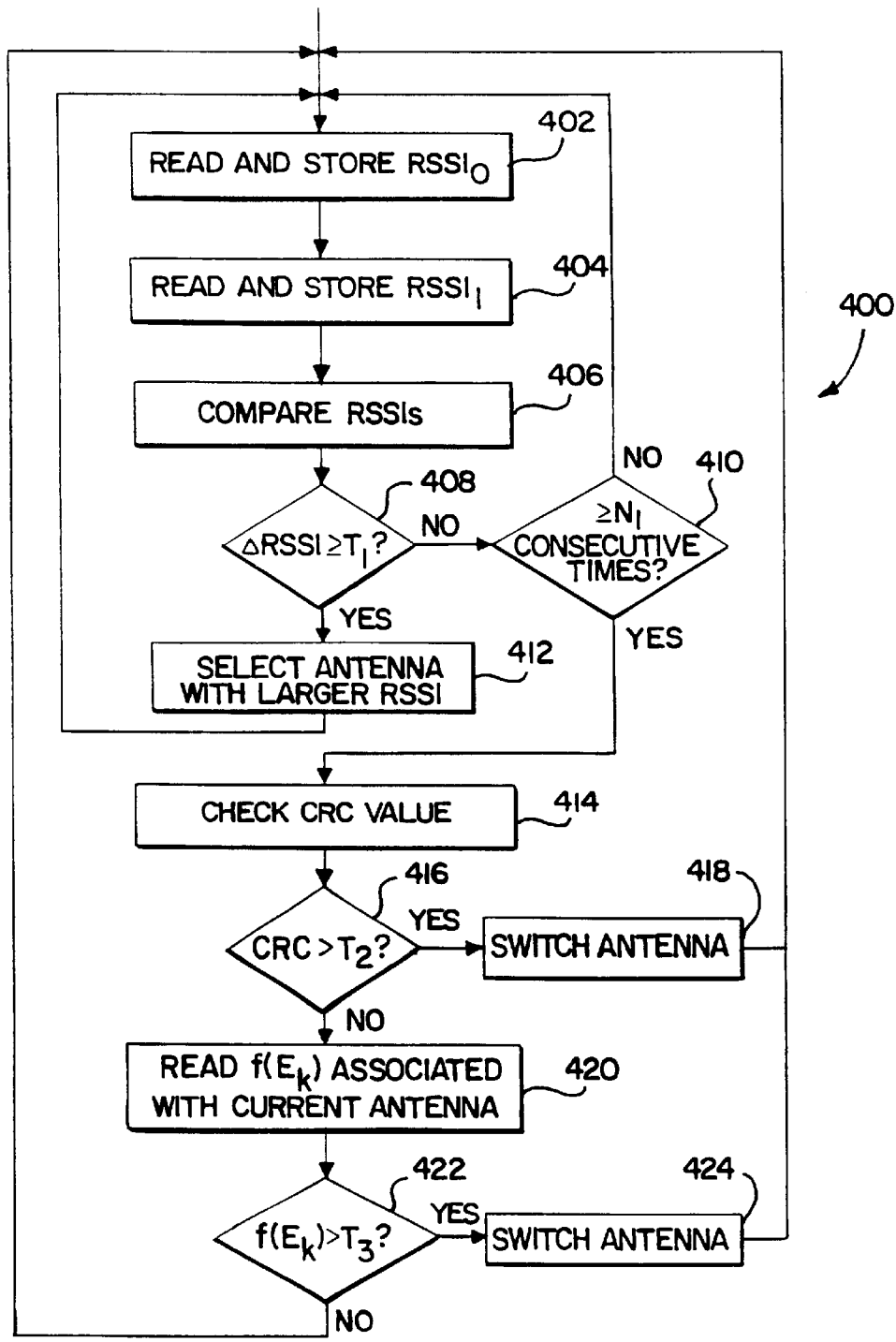
FIG. 4 is a flow chart of a first embodiment of the antenna switching process.

In accordance with the first embodiment 400, an antenna selection system is illustrated in FIG. 4. This embodiment seamlessly integrates a preamble diversity switching process (PDS), a first authentication process, with a cyclical redundancy check (CRC) process, a second authentication process, and the signal vector detection (SVD) process, a third authentication process, to form a unified antenna switching strategy that tracks signal quality.

As shown, radio frequency broadcasts are sequentially processed into receive signal strength indicators $RSSI_0$ and $RSSI_1$ and are stored, where $RSSI_0$ is measured from a first antenna (Antenna$_0$) and $RSSI_1$ is measured from a second antenna (Antenna$_1$) (steps 402 and 404). $RSSI_0$ and $RSSI_1$ are then compared to generate a RSSI difference signal ($\Delta RSSI$). (step 406) When $\Delta RSSI$ is greater than or equal to a first predetermined quality threshold value $T_1$, the antenna having the highest RSSI value is selected and an N-bit counter is reset. (steps 408 and 412) However, when $\Delta RSSI$ is less than $T_1$, the N-bit counter is incremented and then compared to a predetermined slot count $N_1$. (steps 408 and 410) If the value of the N-bit counter is less than $N_1$, protocol requires that the preamble diversity switching process begin a new cycle. (step 410) If, however, the value of the N-bit counter is equal to or greater than $N_1$, protocol initiates CRC control. (step 410)

As described previously, a CRC like parameter authenticates data after the data is received as in a batch process. In this process, the transmitted signal is encoded with a circular redundant code derived from the signal's content. The signal is received and decoded into a CRC error rate. (step 414) The CRC error rate is then compared to a second predetermined quality threshold value, $T_2$. (step 416) In this embodiment a predetermined CRC error rate is used as the threshold $T_2$ to ensure high quality data and audio communications. A CRC error rate of 1%, for example, may be used as the threshold $T_2$ for audio communications, because a CRC error rate below 1% generally produces good voice quality. When the CRC error rate exceeds $T_2$, another antenna is selected and control is returned to the PDS process. (steps 416 and 418) When the CRC error rate is equal to or is less than $T_2$, no switching occurs and protocol transfers control to the SVD process. (step 420)

In the SVD process, $f(E_{k,\ n1})$ associated with the current antenna is read and stored. (step 420) When $f(E_{k,\ n1})$ is greater than a third predetermined quality threshold value $T_3$, another antenna is selected and control is returned to the PDS process. (steps 422 and 424) However, when $f(E_{k,\ n1})$ is equal to or is less than $T_3$, no diversity selections occur and again control is returned to the PDS process (step 422).

Figure 10:
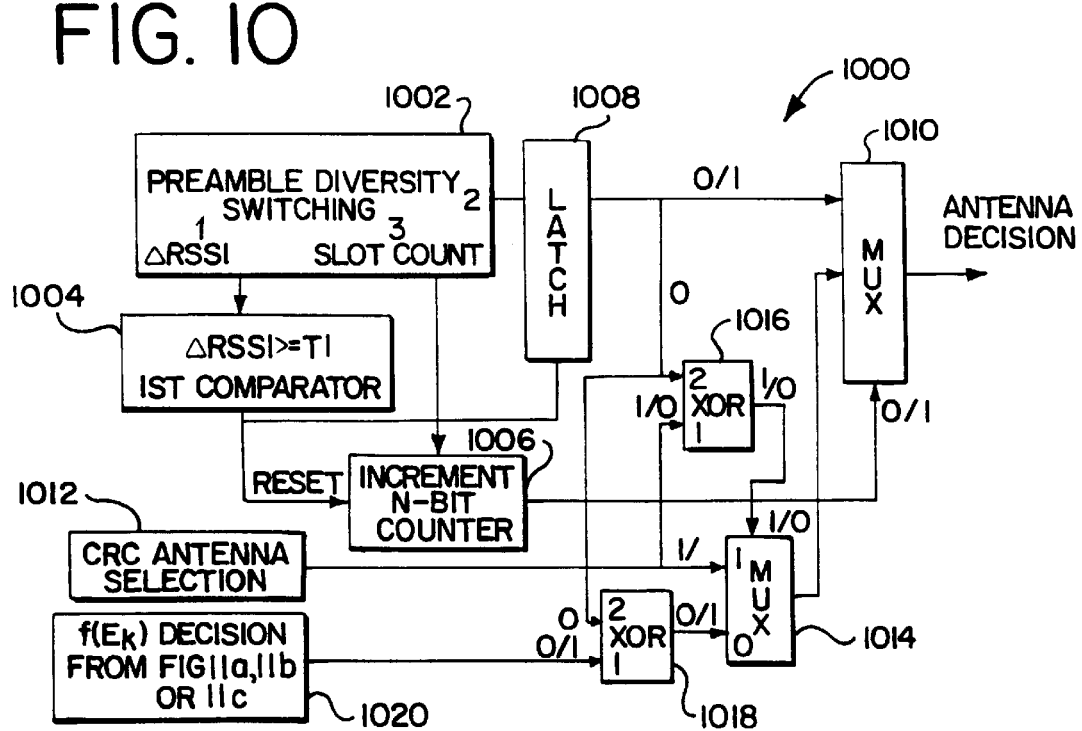
FIG. 10 is a schematic diagram of the of the antenna switching circuits used in the antenna switching processes of FIGS. 4–6.
Figure 11A:
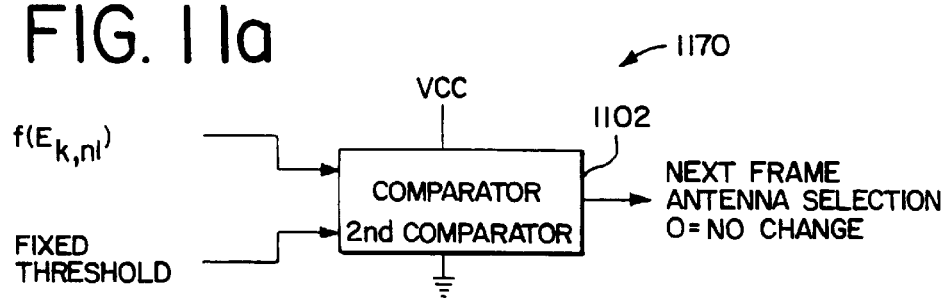
FIGS. 11(a)–(c) are schematic diagrams of the of the Signal Vector Detection circuits used in the antenna switching processes of FIGS. 4–9.
Figure 11B:
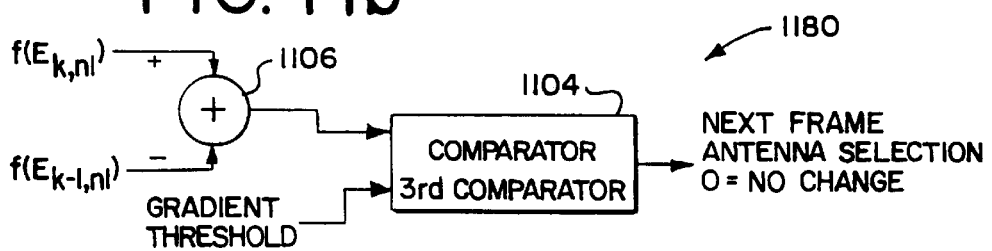
Figure 11C:
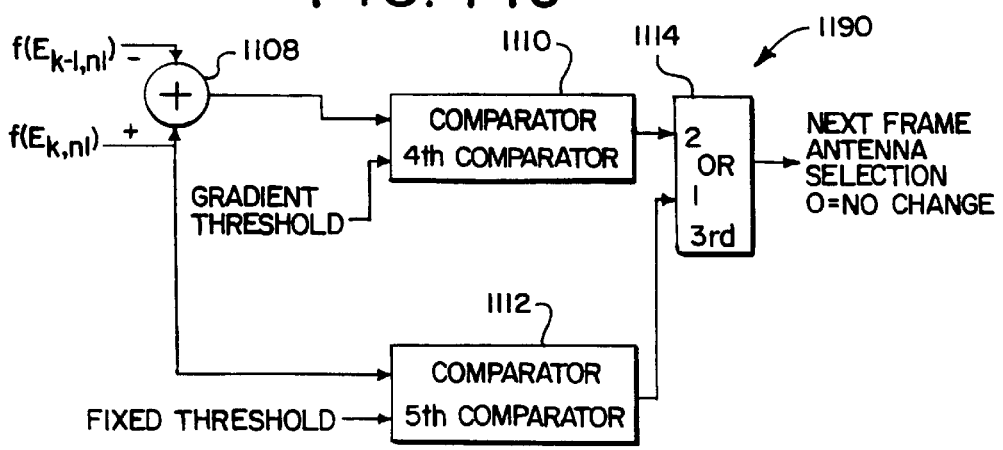

Briefly describing the circuit operation of the first embodiment, as depicted switching circuit 1000 and comparator circuit 1170 in FIGS. 10 and 11(*a*), when the broadcast signals are received the signals are processed using a PDS circuit 1002. The PDS circuit 1002 produces the ΔRSSI signal which is fed to a first comparator circuit 1004 by a first output. When the ΔRSSI is greater than or equal to the first predetermined quality threshold value $T_1$, the first comparator circuit 1004 resets an N-bit counter circuit 1006 and enables a latch circuit 1008. The latch circuit 1008 latches a second output from the PDS circuit 1002 to a first multiplexer circuit 1010 enabled by the N-bit counter circuit 1006 from which an antenna selection occurs. Once the ΔRSSI is less than $T_1$, the N-bit counter circuit 1006 is incremented in response to a third output from the PDS circuit 1002. After more than $N_1$ consecutive low ΔRSSI cycles, control of the antenna selection is transferred to a CRC circuit 1012 by the N-bit counter circuit's 1006 control of the first multiplexer circuit 1010. When the CRC error rate exceeds $T_2$, a second multiplexer circuit 1014 is enabled when a first input of a first exclusive-or circuit 1016 is driven high. A CRC signal is passed through the first multiplexer circuit 1014 and the second multiplexer circuit 1010 from which an antenna selection occurs. When the CRC error rate does not exceed $T_2$, control of the antenna selection is transferred to an $f(E_{k,\ n1})$ based SVD circuit 1020 and comparator circuit 1170. When $f(E_{k,\ n1})$ exceeds $T_3$, the second comparator circuit 1102 drives a first input of a second exclusive-or circuit 1018 high. With the output of the latch circuit 1008 low, the second exclusive-or circuit's 1018 output is driven high which is passed through the first multiplexer circuit 1014 and the second multiplexer circuit 1010 from which an antenna selection occurs. When ΔRSSI equals or exceeds $T_1$, the PDS circuit 1002 resumes control of the selection process and the first comparator circuit 1004 resets the N-bit counter circuit 1006. It should be noted, that memory may be added to the N-bit counter circuit 1006 to track process transfers and the location of multiple portables.

Figure 5:
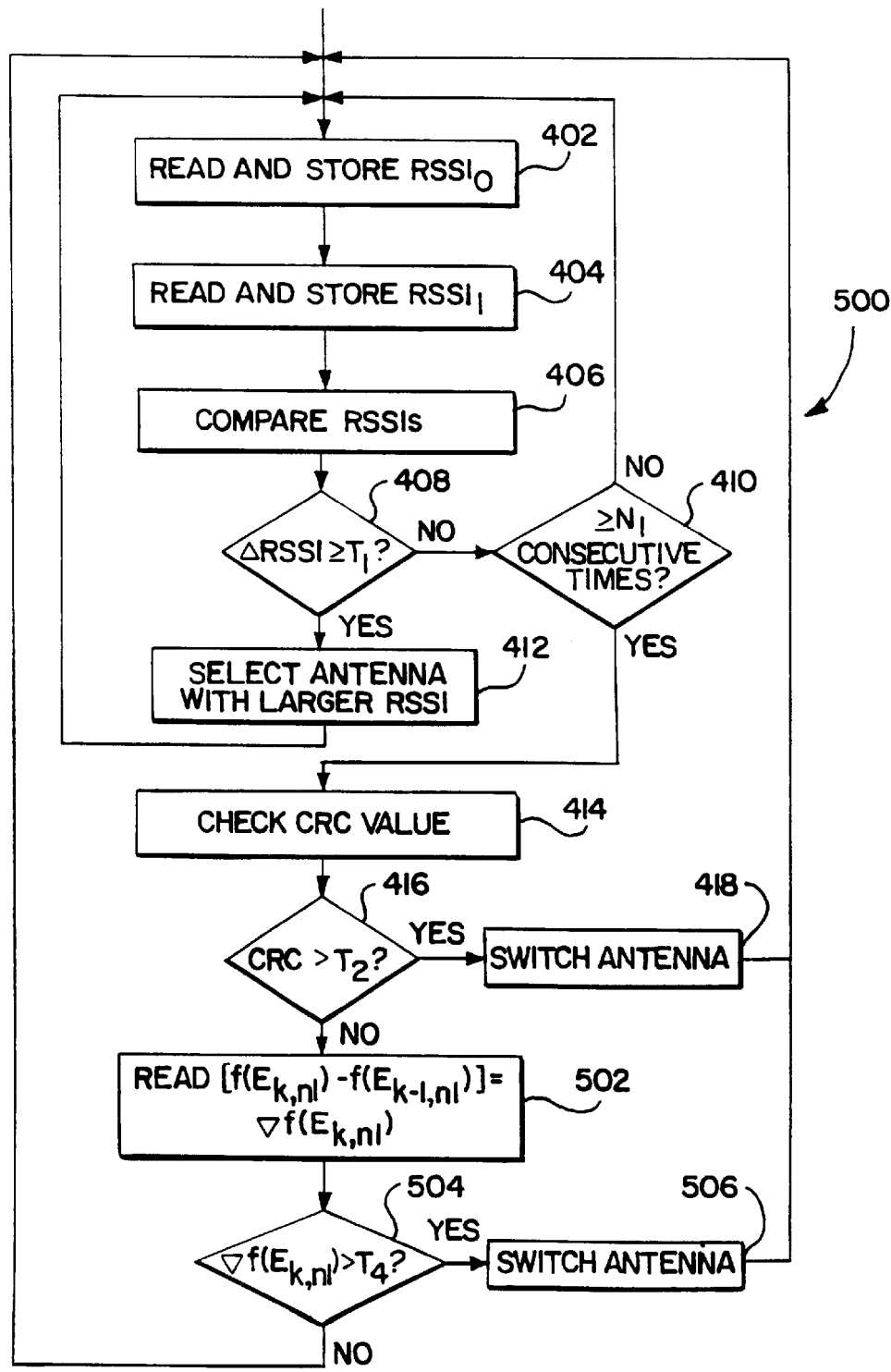
FIG. 5 is a flow chart of a second embodiment of the antenna switching process.

FIG. 5 shows a second embodiment 500 where the real-time signal authentication process (steps 402–412) and the CRC authentication process (steps 414–418) are identical to FIG. 4 and therefore, are labeled with the same reference numbers. Referring to FIG. 5, in the second embodiment the SVD process is based on the gradient error vector, $\nabla f(E_{k,\ n1})$, rather than the RMS of the error vector, $f(E_{k,\ n1})$. In this configuration, $f(E_{k-1,\ n1})$ from multiple previous time frames are stored. The $f(E_{k,\ n1})$ associated with the current antenna is read and compared to $f(E_{k-1,\ n1})$ to generate the $\nabla f(E_{k,\ n1})$ value. ($\nabla f(E_{k,\ n1})=f(E_{k,\ n1})-f(E_{k-1,\ n1})$); (step 502) When the $\nabla f(E_{k,\ n1})$ value is greater than a fourth predetermined threshold $T_4$, an antenna selection occurs and the PDS switching process resumes control of the antenna selection process (steps 504 and 506).

The hardware implementation of the second embodiment is similar to the first embodiment. The only difference is that the comparator circuit 1180 illustrated in FIG. 11(*b*) replaces the comparator circuit 1170 illustrated in FIG. 11 (*a*). As shown in FIGS. 10 and 11(*b*), $f(E_{k,\ n1})$ is subtracted from $f(E_{k-1,\ n1})$ by a first summing amplifier 1106 and is then compared to the fourth predetermined threshold $T_4$. When the difference signal $(f(E_{k,\ n1})-f(E_{k-1,\ n1}))$ exceeds $T_4$, a third comparator circuit 1104 drives the first input of the second exclusive-or circuit 1018 high. Note that the circuits shown in FIG. 10 are the same circuits previously described.

Figure 6:
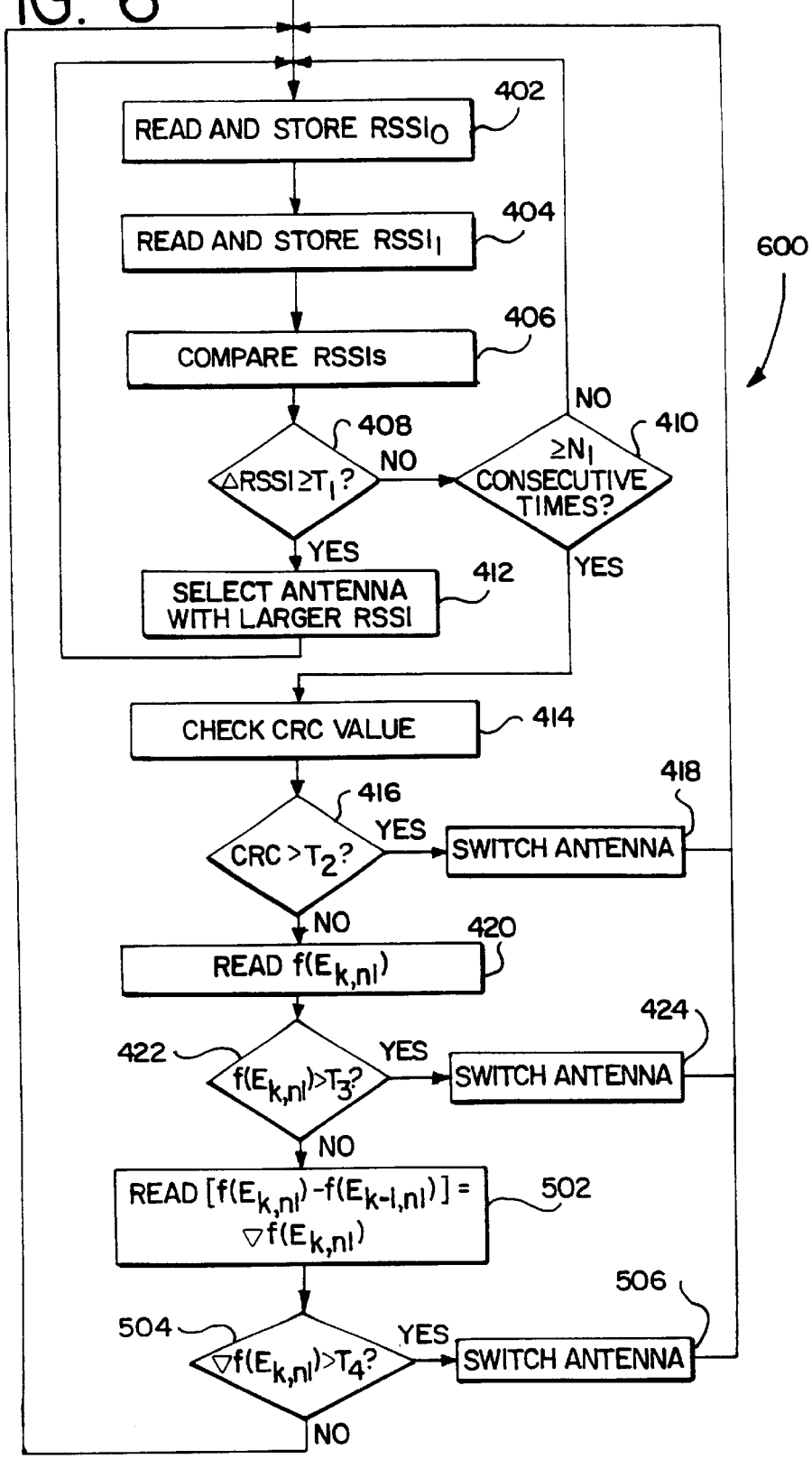
FIG. 6 is a flow chart of a third embodiment of the antenna switching process.

Referring to FIG. 6 which shows a third embodiment 600 of the invention, the unified antenna switching strategy includes the PDS, CRC, and the $f(E_{k,\ n1})$ based SVD process combination illustrated in FIG. 4. The processes are identical and therefore are labeled with the same reference numbers. As shown in this configuration, a second SVD process that tracks $\nabla f(E_{k,\ n1})$ is employed after the $f(E_{k,\ n1})$ based SVD process. These processes operate as was previously described.

FIGS. 10 and 11(*c*) show the third embodiment's switching circuit 1000 and comparator circuit 1190 in detail. It will be understood that the circuit shown in FIG. 10 operates in the same manner as was previously described. However, because a second SVD process is employed, the circuit configuration that implements the SVD processes is different. To this end, FIG. 11(*c*) illustrates the combined fixed and gradient decision circuitry. As shown, $f(E_{k,\ n1})$ is subtracted from $f(E_{k-1,\ n1})$ by a second summing amplifier 1108 and is compared to the fourth predetermined threshold $T_4$ by a fourth comparator circuit 1110. When the difference signal $(f(E_{k,\ n1})-f(E_{k-1,\ n1}))$ exceeds $T_4$, a fourth comparator circuit 1110 drives a second input of a third exclusive-or circuit 1114 high. Similarly, when $f(E_{k,\ n1})$ exceeds the third predetermined threshold $T_3$, a fifth comparator circuit 1112 drives a first input of the third exclusive-or circuit 1114 high. An antenna selection under these SVD processes occurs only when one of the two inputs of the third exclusive-or circuit 1114 is driven high.

Figure 7:
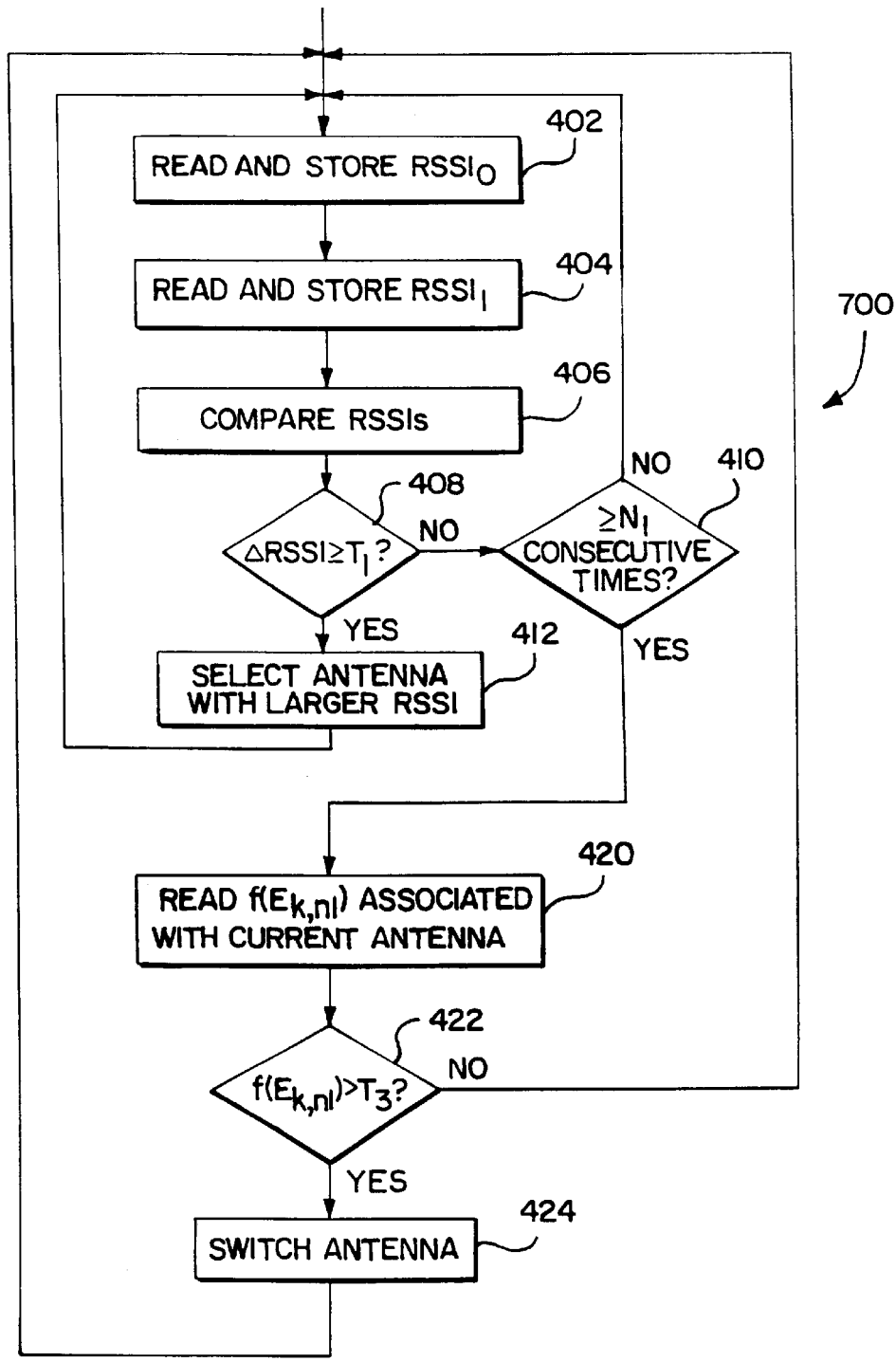
FIG. 7 is a flow chart of a fourth embodiment of the antenna switching process.

FIG. 7 shows a fourth embodiment 700 of the invention in which the unified antenna switching strategy includes the PDS and $f(E_{k,\ n1})$ based SVD processes but does not include the CRC process. The PDS and the $f(E_{k,\ n1})$ based SVD processes are identical and operate in the same manner as was described in the previous applications and are labeled with the same reference numbers shown in FIGS. 4–6.

Figure 12:
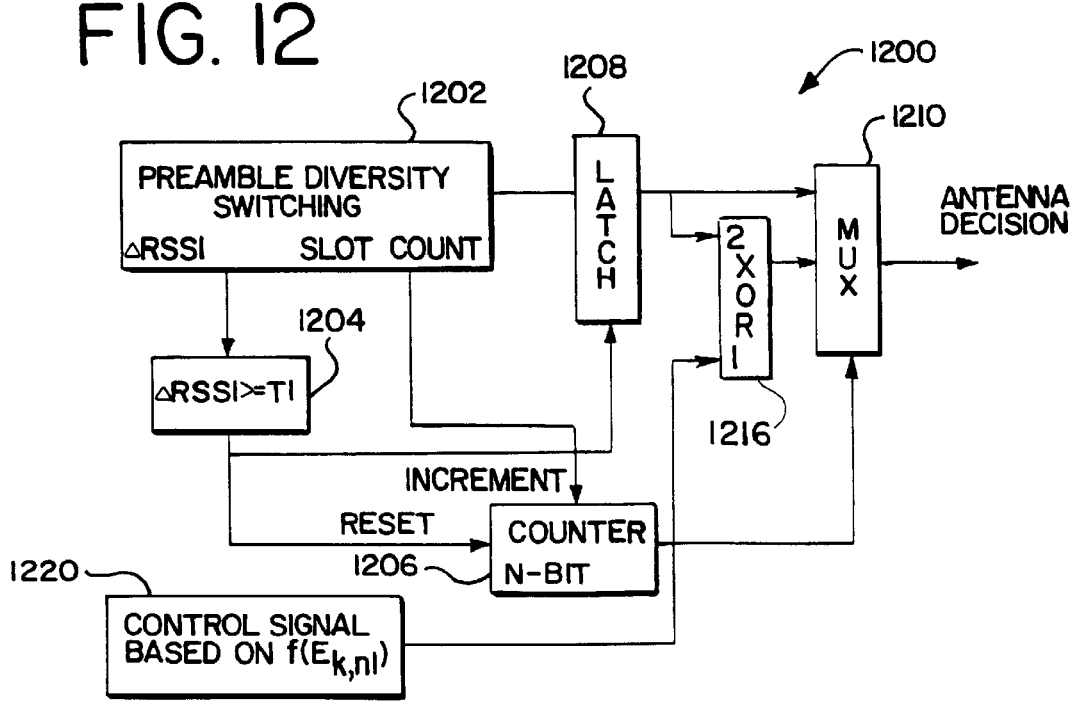
FIG. 12 is a schematic diagram of the antenna switching circuits used in the antenna switching processes of FIGS. 7–9.

FIGS. 12 and 11(*a*) illustrate exemplary circuits 1200 and 1170, respectively, that will implement the fourth embodiment. When the broadcast signals are received the signals are processed using a PDS circuit 1202. The PDS circuit 1202 produces the ΔRSSI signal which is fed to a first comparator circuit 1204 by a first output. When the ΔRSSI is greater than or equal to the predetermined quality threshold value $T_1$, the first comparator circuit 1204 resets an N-bit counter circuit 1206 and enables a latch circuit 1208. The latch circuit 1208 latches a second output from the PDS circuit 1202 to multiplexer 1210 and to a second input of an exclusive-or circuit 1216. When the SVD circuit 1220 is low the exclusive-or circuit's 1216 output is driven high which is passed through multiplexer circuit 1210 by the N-bit counter's circuit 1206 selection. Once the ΔRSSI is less than $T_1$, the N-bit counter circuit 1206 is incremented in response to a third output from the PDS circuit 1202. After more than $N_1$ consecutive low ΔRSSI cycles, control of the antenna selection process is transferred to an $f(E_{k,\ n1})$ based SVD circuit 1220 and 1170. It will be understood that the SVD circuits illustrated in FIGS. 11(*a*)–(*c*) operate in the same manner as the previous embodiments. When the output of the $f(E_{k,\ n1})$ based SVD circuit 1170 illustrated in FIG. 11(*a*) is high and the output of the latch circuit 1208 is low, the exclusive-or circuit's 1216 output is driven high which is passed through the multiplexer circuit 1210 by the N-bit counter's circuit 1206 from which an antenna selection occurs. It should be noted, that memory may be added to the N-bit counter circuit 1206 to track process transfers and the location of multiple portables.

Figure 8:
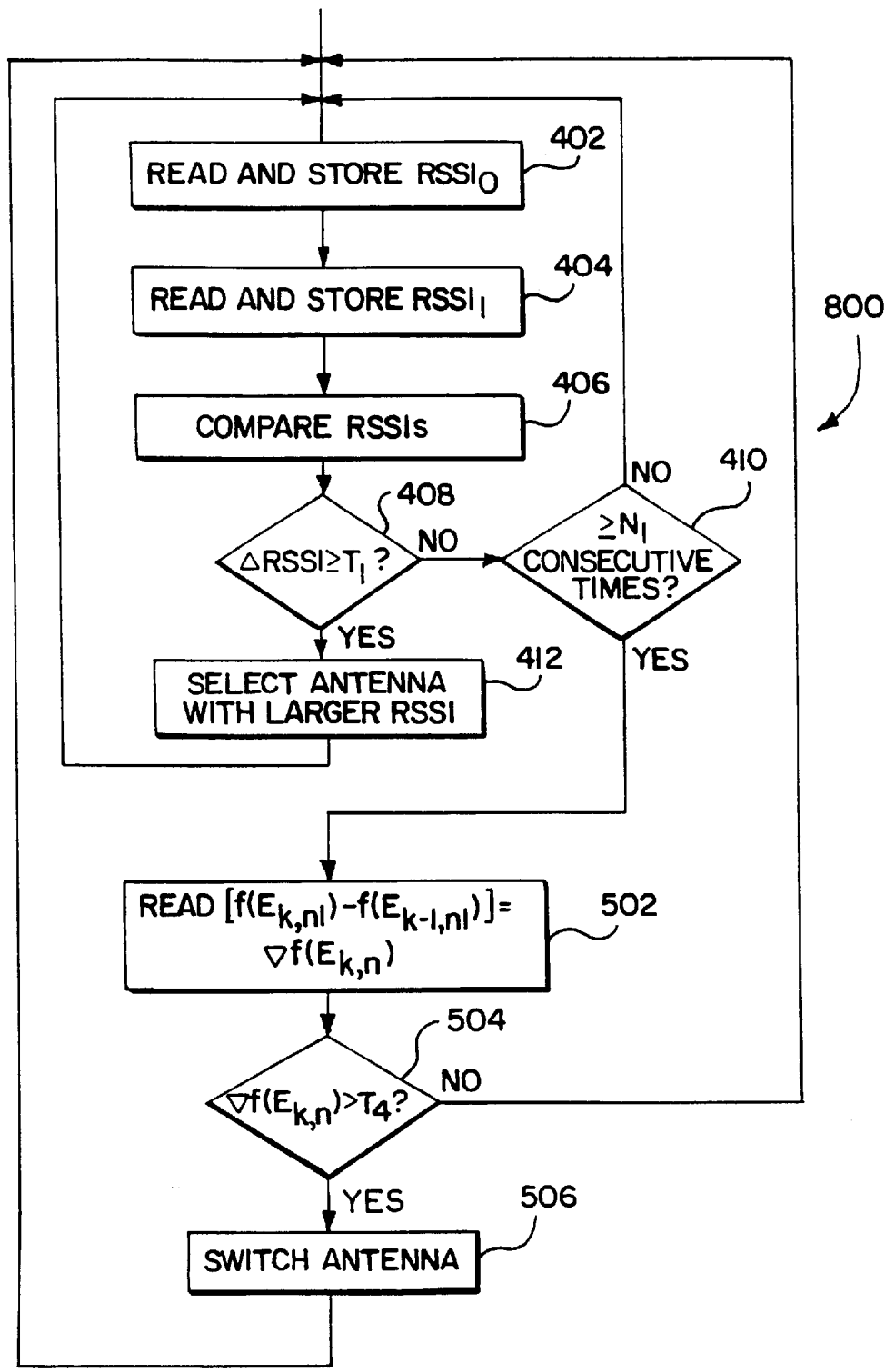
FIG. 8 is a flow chart of a fifth embodiment of the antenna switching process.

FIG. 8 shows a fifth embodiment 800 of the invention in which the unified antenna switching strategy includes the PDS and $\nabla f(E_{k,n1})$ based SVD process but does not include the CRC process. The PDS and $\nabla f(E_{k,\ n1})$ based SVD process are identical and operate in the same manner as was described in the previous applications and are labeled with the same reference numbers as illustrated in FIGS. 4–7. It will also be understood that the exemplary circuits 1200 and 1180 that implement this embodiment illustrated in FIGS. 12 and 11(*b*) operate in the same manner as was previously described.

Figure 9:
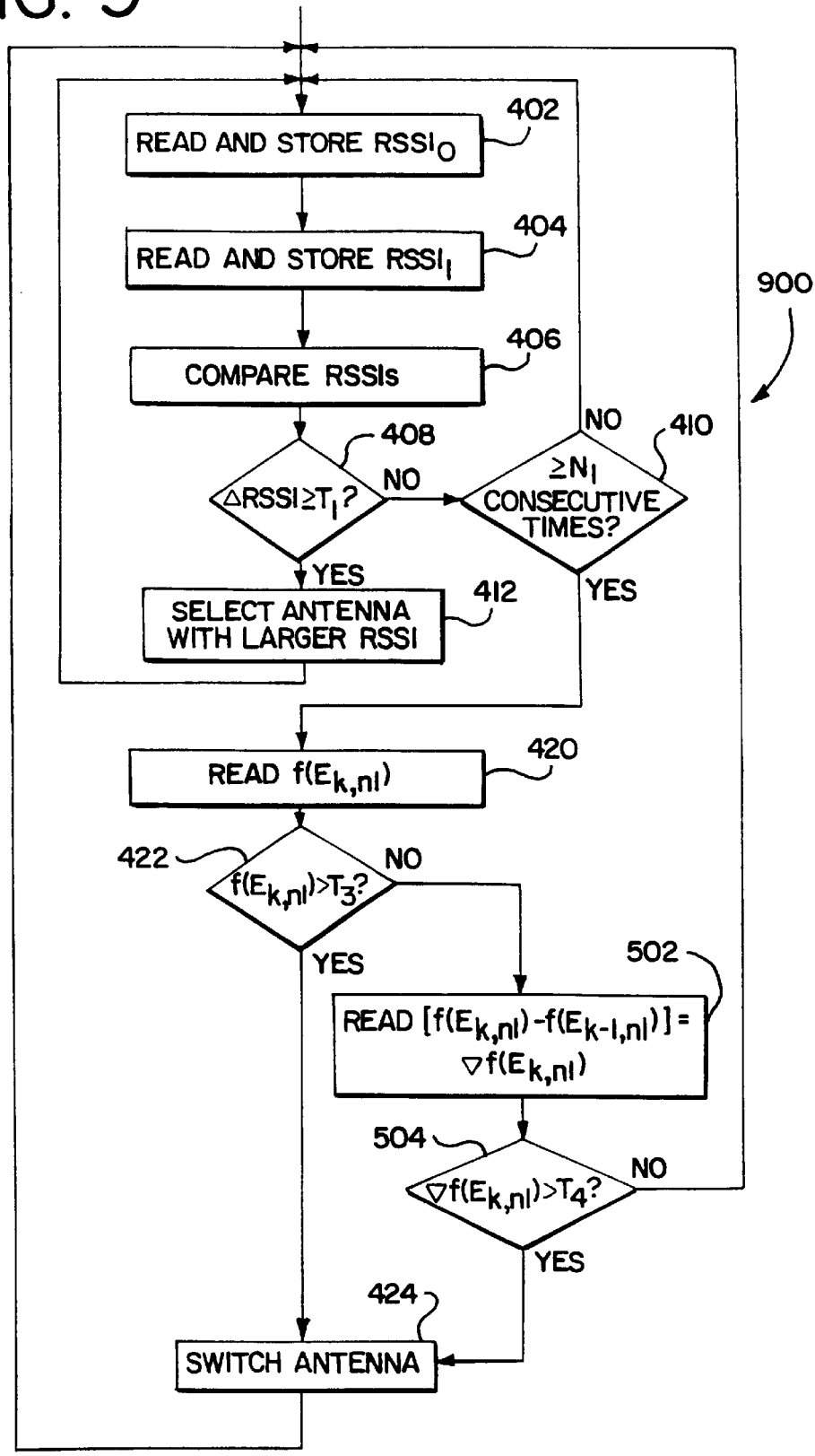
FIG. 9 is a flow chart of a sixth embodiment of the antenna switching process.

FIG. 9 shows a sixth embodiment 900 of the invention in which the unified antenna switching strategy includes the PDS, $f(E_{k,\ n1})$, based SVD, and $\nabla f(E_{k,\ n1})$ based SVD processes, but does not include the CRC process. The PDS, $f(E_{k,\ n1})$ based SVD, and $\nabla f(E_{k,n1})$ based SVD processes are identical and operate in the same manner as was explained in the previous embodiments and are labeled with the same reference numbers illustrated in FIGS. 4–8. It will also be understood that the exemplary circuits 1200 and 1190 that implement this embodiment illustrated in FIGS. 12 and 11(*c*) operate in the same manner as was previously described.

The embodiments previously described use counters, threshold comparators, exclusive-or gates, digital multiplexers, PDS, CRC and SVD circuits. The various parameters including $T_1$, $T_2$, $T_3$, $T_4$, and $N_1$ vary according to the environment of the embodiment's use as rural and urban areas have different receiving characteristics. It should also be noted that other authentication selection processes may be employed.

Many changes and modifications can be made to the form of the invention without departing from its spirit. The foregoing detailed description is intended to be illustrative rather than limiting and it is understood that the following claims are intended to define the scope of the invention.

We claim:

1. An antenna selection and switching system which is capable of selecting an antenna from a diversity of antennas by verifying the integrity of electronic signals received from said diversity of antennas in a TDMA wireless communication system, wherein the system comprises:

a preamble diversity switching process linked to said diversity of antennas for selecting an antenna based on a received signal preamble quality;

a cyclical redundancy code process communicating with said preamble diversity switching process and linked to said diversity of antennas for selecting an antenna based on a received cyclical redundancy code quality;

a signal vector detection process communicating with said cyclical redundancy code process and linked to said diversity of antennas for selecting an antenna based on a received signal phase quality; and protocol means coupled to said processes for selecting from among said preamble diversity switching process, said cyclical redundancy code process, and said signal vector detection process, providing said antenna selection.

2. The antenna selection and switching system as defined in claim 1, wherein said signal vector detection process is based on the strength of a plurality of gradient error vectors of said signals and selection of said antenna is delayed until said signals' gradient error vector exceeds a fourth predetermined quality threshold.

3. An antenna selection and switching system as defined in claim 1, wherein said protocol means is responsive first to the operability of said preamble diversity switching process, second to the operability of said cyclical redundancy code process, and third to the operability of said signal vector detection process.

4. The antenna selection and switching system as defined in claim 1, wherein said signal vector detection process is based on the strength of an error vector of said signal and selection of said antenna is delayed until said signal's error vector exceeds a third predetermined quality threshold.

5. The antenna selection and switching system as defined in claim 1, wherein said preamble diversity switching process selection of said antenna is delayed until a received signal quality at least equals a first predetermined quality threshold.

6. The antenna selection and switching system as defined in claim 1, wherein said cyclical redundancy code process selection of said antenna is delayed until a received signal quality exceeds a second predetermined quality threshold.

7. An antenna selection and switching system as defined in claim 1, wherein said protocol means for selecting said antenna further comprises an N-bit counter for selectively delaying said antenna selection.

8. An antenna selection and switching system as defined in claim 7, wherein said N-bit counter is programmable and has memory means for storing information corresponding to said process selections thereby identifying a combination of processes most frequently utilized.

9. An antenna selection and switching system as defined in claim 7, wherein said N-bit counter is programmable and has a memory array for storing information corresponding to the location of a plurality of portables.

10. The antenna selection and switching system as defined in claim 7, wherein said N-bit counter is reset to a pre-set value in response to said preamble diversity switching process selection of said antenna.

11. An antenna selection and switching system as defined in claim 1, wherein said TDMA wireless communication system further comprises a plurality of antennas responsive to TDMA transmissions.

12. An improved system for selecting a single antenna from a diversity of antennas in a DECT/PWT-based telephone communication system that is capable of verifying the quality of transmitted signals, comprising:

first means switchably coupled to said diversity of antennas for authenticating said signals and selecting a single antenna as signals are received using a preamble diversity switching process;

second means switchably coupled to said first means for authenticating said signals and selecting a single antenna after said signals are received using a cyclical redundancy code encryption process;

third means switchably coupled to said second means for authenticating said signals and selecting said single antenna after said signals are received using a phase modeling process; and protocol means controllably coupled to said first, second and third means for transferring said antenna selection between said first means, said second means, and said third means.

13. The system as defined in claim 12, wherein said phase modeling process is based on the strength of a gradient error vector of a signal and said third means selection of said antenna is delayed until said signal's gradient error vector exceeds a fourth predetermined quality threshold.

14. The system as defined in claim 12, wherein said phase modeling process is based on the strength of an error vector of a signal and said third means selection of said antenna is delayed until said signal's error vector exceeds a third predetermined quality threshold.

15. The system as defined in claim 12, wherein said DECT/PWT-based telephone communication system further comprises a plurality of antennas responsive to DECT/PWT transmissions.

16. The system as defined in claim 12, wherein said first means selection of said antenna is delayed until a received signal quality at least equals a first predetermined quality threshold.

17. The system as defined in claim 12, wherein said second means selection of said antenna is delayed until a received signal quality exceeds a second predetermined quality threshold.

18. The system as defined in claim 12, wherein said phase modeling process is determined as a function of the strength of an error vector and a gradient error vector of said signal.

19. The system as defined in claim 12, wherein said protocol means for selecting said antenna further comprises an N-bit counter for selectively delaying said antenna selection.

20. The system as defined in claim 19, wherein said N-bit counter is programmable and has memory means for storing information corresponding to said process selections thereby identifying a combination of processes most frequently utilized.

21. The system as defined in claim 19, wherein said N-bit counter is programmable and has a memory array for storing information corresponding to the location of a plurality of portables.

22. The system as defined in claim 19, wherein said N-bit counter is reset to a pre-set value in response to said preamble diversity switching process selection of said antenna.

23. The system as defined in claim 12, wherein said phase modeling process is based on the strength of a gradient error vector of said signal.

24. The system as defined in claim 12, wherein said phase modeling process is based on the strength of an error vector of said signal.

25. A TDMA-based diversity antenna switching system for selecting a single antenna comprising:
   a plurality of antennas for receiving TDMA based signals;
   a primary controller switchably linked to said plurality of antennas for authenticating said received signals and selecting said single antenna as a signal is authenticated using a preamble diversity switching process;
   a secondary controller switchably linked to said plurality of antennas for authenticating said received signals and selecting said single antenna as a signal is authenticated using a signal vector detection process; and
   a switching device controllably linked to said primary and secondary controllers for selecting one of said primary and secondary controllers to select an antenna.

26. The TDMA-based diversity antenna switching system as defined in claim 25, wherein said switching device includes means for delaying said antenna selection and has a memory array capable of storing information corresponding to the location of a plurality of portables.

27. The TDMA-based diversity antenna switching system as defined in claim 25, wherein said signal vector detection process is a function of a comparison between the magnitude of a signal gradient error vector and a fourth predetermined quality threshold.

28. The TDMA-based diversity antenna switching system as defined in claim 25, wherein said signal vector detection process is a function of a comparison between the magnitude of a signal vector error and a third predetermined quality threshold.

29. The TDMA-based diversity antenna switching system as defined in claim 25, wherein said switching device is responsive first to said primary controller and second to said secondary controller.

30. The TDMA-based diversity antenna switching system as defined in claim 25, wherein said signal vector detection process is based on an error vector and a gradient error vector.

31. An antenna diversity switching device used in a TDMA based communication system which is capable of selecting a single antenna from a plurality of antennas in response to the quality of signals received from said plurality antennas, wherein the device comprises:
   means for detecting said signal quality in both
      a real mode responsive to said signal quality measured as said signals are received; and
      a batch mode responsive to said signal's phase quality measured after said signals are received; and
   a controller operatively linked to said detection means for selecting said single antenna in response to one of said detection means modes.

32. The antenna diversity switching device as defined in claim 31, wherein said controller's selection of said antenna in response to said batch mode detection controller's is based on the strength of a gradient error vector of said signal and selection of said antenna is delayed until said signal's gradient error vector exceeds a fourth predetermined quality threshold.

33. The antenna diversity switching device as defined in claim 31, wherein said controller's selection of said antenna in response to said batch mode detection means is based on the strength of an error vector of said signal and selection of said antenna is delayed until said signal's error vector exceeds a third predetermined quality threshold.

34. The antenna diversity switching device as defined in claim 31, wherein said controller is interfaced to a programmable numerical counter having advancing means for delaying said controller's selection of said antenna in said batch mode until the value of said counter equals the value of a predetermined number.

35. The antenna diversity switching device as defined in claim 34, wherein said programmable numerical counter has memory means for storing information corresponding to said process selections thereby identifying a combination of processes most frequently utilized.

36. The antenna diversity switching device as defined in claim 34, wherein said programmable numerical counter has a memory array for storing information corresponding to the location of a plurality of portables.

37. The antenna diversity switching device as defined in claim 34, wherein said controller resets said counter to a pre-set value in response to said real mode detection means selection of said single antenna.

38. The antenna diversity switching device as defined in claim 31, wherein said controller's selection of said antenna in response to said real mode detection means is delayed until said received signal quality at least equals a first predetermined quality threshold.

39. The antenna diversity switching device as defined in claim 31, wherein said controller delays said real mode selection of said antenna until a predetermined threshold is exceeded.

40. A method of selecting a TDMA-based telephone communication antenna for receiving signals, said method comprising:

receiving a signal from a plurality of antennas;

processing said signal alternatively in a preamble diversity mode and in a signal vector detection mode; and then selecting said antenna from said plurality of antennas by verifying the authenticity of said received signal in response to one of said processing modes.

41. The method of claim 40, wherein the method includes the step of storing information corresponding to said process selections thereby identifying a combination of processes most frequently utilized.

42. The method of claim 40, wherein the method includes the step of storing information corresponding to the location of a plurality of portables.

43. The method of claim 40, wherein said signal vector detection mode is based on a gradient error vector of said received signal.

44. The method of claim 40, wherein said processing of said signal is selectively delayed in response to a numerical counter.

45. The method of claim 40, wherein said signal vector detection mode is based on an error vector of said received signal.

* * * * *